United States Patent Office 3,686,171

Patented Aug. 22, 1972

3,686,171

N-4-FORMYL-5-AMINO PYRAZOLES

Leo Ralph Swett and James Daniel Ratajczyk, Waukegan, and Patrick Richard Young, Winthrop Harbor, Ill., assignors to Abbott Laboratories, North Chicago, Ill.

No Drawing. Continuation-in-part of application Ser. No. 672,717, Oct. 4, 1967, now Patent No. 3,544,585, dated Dec. 1, 1970. This application Dec. 2, 1970, Ser. No. 94,588

Int. Cl. C07d *49/20*

U.S. Cl. 260—240 G 1 Claim

ABSTRACT OF THE DISCLOSURE

A novel series of N'-[4-formyl]-5-amido-pyrazoles which are useful as intermediates in preparing N'-[4-(hydroxymethyl)-5-pyrazolyl]amidines. The amidines are effective anti-inflammatory agents.

CROSS-REFERENCE TO RELATED APPLICATIONS

This is a continuation-in-part of our co-pending application, Ser. No. 672,717 filed October 4, 1967, now U.S. Pat. 3,544,585 granted Dec. 1, 1970.

DESCRIPTION OF INVENTION

This invention is directed to novel intermediates which are useful in preparing compounds having the general structural formula

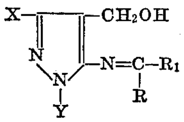

wherein X is selected from the group consisting of phenyl and loweralkyl; Y is selected from the group consisting of phenyl, loweralkyl and halophenyl; R is a member selected from the group consisting of hydrogen and loweralkyl; and $R_1$ is a member selected from diloweralkylamino, piperidino, 1-piperazinyl, 4-methyl-1-piperazinyl and morpholino. As used herein, the term "loweralkyl" refers to alkyl chains having from 1 to 4 carbon atoms.

In general, these compounds are prepared by reacting a 5-amino-1,3-disubstituted pyrazole derivative with a formylated secondary amine of the general formula

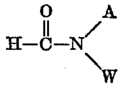

wherein A and W each represent loweralkyl or, A and W together form a cyclic secondary amine, in the presence of a suitable catalyst. This reaction yields a pyrazole derivative having the amide condense at the 5-amino position and the formyl group substituted at the 4-position. This compound is then reduced with any suitable reducing agent to yield the final product.

This reaction scheme may be represented as follows:

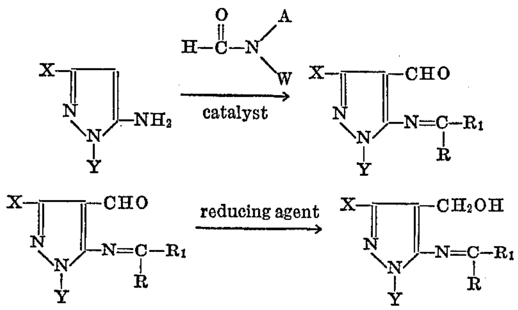

I

II

The reaction is carried out under heat and with an excess of the formylated secondary amine according to the Vilsmeier-Haack aldehyde synthesis reaction. The catalyst generally employed in this reaction is phosphorous oxychloride since this agent is unusually suited to accomplish the condensation of the formyl group at the 4-position of the pyrazole ring. An excess amount of formylated secondary amine must be used since it supplies the formyl group for the 4-position condensation as well as supplying material for the condensation to the amine group at the 5-position on the pyrazole ring. That is, the formylated secondary amine supplies the carbon atom adjacent the double bond at the 5-position nitrogen atom.

The formylated secondary amines suitable in the practice of this invention include the following: 1-formylpiperidine, 1 - formyl-4-methylpiperazine, diethylformamide, 1-formylmorpholine and dimethylformamide. In the case where R is loweralkyl, other acylated amines may be used. For example, N,N-dimethylacetamide in the presence of phosphorous oxychloride condenses with the 1,3 - disubstituted-5-aminopyrazole to yield N'-(1,3-disubstituted-5-pyrazolyl)-N,N-dimethylacetamidine.

The 4-formyl group can then be introduced into the pyrazole nucleus by the use of dimethylformamide and phosphorous oxychloride.

In order to better illustrate this invention, reference is made to the following examples which are intended to describe several embodiments of the invention, and are not intended to limit same thereby.

EXAMPLE A

Preparation of 5-amino-1,3-diphenylpyrazole

To a stirred solution of 550 ml. of water and 150 ml. of concentrated hydrochloric acid, is added dropwise 108 grams (1.0 molar) of phenylhydrazine. Following this addition, 144 grams (1.0 molar) of 3-imino-3-phenylpropionitrile is added and the reaction mixture is then heated to 80°–90° C. for 30 minutes. To the heated reaction mixture is slowly added 150 ml. of concentrated hydrochloric acid and the mixture is heated to reflux for one hour. The mixture is then cooled in an ice bath and made alkaline by the addition of about 250 ml. of concentrated ammonium hydroxide until a precipitate forms.

The precipitate is filtered and washed thoroughly with water, then dried. The product is crystallized from ethanol and water yielding 153 grams of 5-amino-1,3-diphenylpyrazole having a melting point of 131°–133° C.

EXAMPLE B

Preparation of 5-amino-1-methyl-3-phenylpyrazole

A mixture of 13 grams (0.09 mole) of benzoylacetonitrile and 4.1 grams (0.09) mole) of methylhydrazine is refluxed together in 75 ml. of ethanol for 3 hours. The solvent is then removed in vacuo and the residual oil crystallized from ethyl acetate and a solvent consisting of a mixture of saturated hydrocarbons consisting mainly of hexane, having a boiling point of 60°–68° C. and commonly known by the trademark "Skellysolve B," yielding 8.1 grams of 5-amino-1-methyl-3-phenylpyrazole having a melting point of 124°–126° C.

Although Examples A and B illustrate methods for making the 5-amino-1,3-disubstituted pyrazoles necessary as one of the starting materials to prepare the compounds of the instant invention, such methods are known in the art. Furthermore, the 5-amino-1,3-disubstituted pyrazoles are known compounds and are therefore not deemed to be a part of this invention, except to the extent that they are starting materials for making the novel compounds disclosed herein.

The following examples illustrate methods of preparing various members of the N'-[4-(hydroxymethyl)-5-pyrazolyl]amidine series of this invention.

EXAMPLE 1

1-[N-[4-(hydroxymethyl)-1,3-diphenyl-5-pyrazolyl] formimidoyl]piperidine

A mixture of 23.5 grams (0.1 mole) of 5-amino-1,3-diphenylpyrazole and 45 grams (0.4 mole) of formylpiperidine is heated to 70° C. and to this mixture is added dropwise 63 grams (0.41 mole) of phosphorous oxychloride with stirring. After the addition is complete, the mixture is heated to 90° C. for one hour. The mixture is then poured onto ice and stirred until the complex is hydrolyzed. A saturated solution of sodium bicarbonate is added until the mixture is alkaline. The crude product is filtered, washed with water and crystallized from ethanol yielding 12.8 grams of 1-[N-(4-formyl-1,3-diphenyl-5-pyrazolyl)formimidoyl]piperidine, having a melting point of 140°–142° C.

The 1 - [N-(4-formyl-1,3-diphenyl-5-pyrazolyl)formimidoyl]piperidine is suspended in methanol and cooled in an ice bath with stirring. An equimolar proportion of sodium borohydride is added and the reaction mixture is allowed to come to room temperature and is stirred for 3 to 4 hours. A precipitate forms which is filtered off. Water is added to the filtrate until crystallization begins, and the precipitate is filtered and dried. Recrystallization from ethyl acetate yields 7.4 grams of 1-[N-[4-(hydroxymethyl) - 1,3 - diphenyl-5-pyrazolyl]formimidoyl]piperidine, having a melting point of 170°–171° C.

Following the procedure of Example 1, the other members of this series of compounds may be similarly prepared. That is, the desired compound is obtained by reacting the appropriate 5-amino-1,3-disubstituted pyrazole with the corresponding formylated secondary amine and phosphorous oxychloride, and reducing the product of this reaction with a suitable reducing agent such as sodium borohydride, lithium aluminum hydride, or other known reducing agents. Table I following below lists several specific embodiments prepared in accordance with this procedure. Columns A and B describe the reactants, Column C, the product, and Column D, an identifying physical constant, e.g., melting point in degrees centigrade.

1,3-diphenyl-5-pyrazolyl)-N,N-dimethylacetamidine. This intermediate is then reduced by reaction with sodium borohydride yielding N'-[4-(hydroxymethyl) - 1,3 - diphenyl-5-pyrazolyl]-N,N-dimethylacetamidine, having a melting point of 140°–142° C.

Following the procedure of Example A and by using the appropriately substituted halophenylhydrazine in place of phenylhydrazine, one may prepare the 5-amino-1-halophenylpyrazoles according to the following reaction scheme

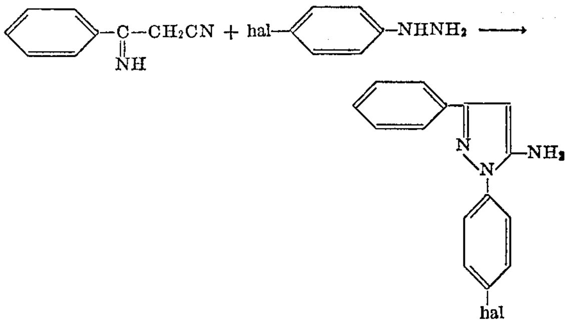

This material may then be used as starting material in accordance with the procedure of Example 1 to give the 4-formyl derivative which on reduction yields a halo-substituted phenyl moiety in the 1-position of the pyrazole ring. Examples of such compounds include N'-[4-(hydroxymethyl)-1-(4-fluorophenyl) - 3 - phenyl-5-pyrazolyl]-N,N-dimethylformamidine;
N'-[4-(hydroxymethyl) - 1 - (4-chlorophenyl)-3-phenyl-5-pyrazolyl]-N,N-dimethylformamidine;
N'-[4-(hydroxymethyl)-1-(4-bromophenyl)-3-phenyl-5-pyrazolyl]-N,N-dimethylformamidine;
N'-[4-(hydroxymethyl)-1-(2,4-dichlorophenyl)-3-phenyl-5-pyrazolyl]-N,N-dimethylformamidine;
N',[4-(hydroxymethyl)-1-(3,4-dichlorophenyl)-3-phenyl-5-pyrazolyl]-N,N-dimethylformamidine;
N'-[4-(hydroxymethyl)-1-(2,4-dibromophenyl)-3-phenyl-5-pyrazolyl]-N,N-dimethylformamidine;
N'-[4-(hydroxymethyl)-1-(3,4-dibromophenyl)-3-phenyl-5-pyrazolyl]-N,N-dimethylformamidine.

TABLE I

| Example | A | B | C[1] | D,° |
|---|---|---|---|---|
| 2 | 5-amino-1,3-diphenylpyrazole | 1-formyl-4-methylpiperazine | 1-[N-[4-(hydroxymethyl)-1,3-diphenyl-5-pyrazolyl]-formidol]-4-methylpiperzaine. | 126–128 |
| 3 | do | Diethylformamide | N,N-diethyl-N'-[4-(hydroxymethyl)-1,3-diphenyl-5-pyrazoly]formamidine. | 152–154 |
| 4 | do | 4-formylmorpholine | 4-[N-[4-(hydroxymethyl)-1,3-diphenyl-5-pyrazolyl] formimidoyl]formamidine. | 170–172 |
| 5 | 5-amino-3-methyl-1-phenylpyrazole | Dimethylforniaide | N'-[4-(hydroxymethyl)-3-methyl-1-phenyl-5-pyrazolyl]-N,N-dimethylformamidine. | 118–120 |
| 6 | 5-amino-1-methyl-3-phenylpyrazole | do | N'-[4-(hydroxymethyl)-1-methyl-3-phenyl-5-pyrazolyl]-N,N-dimethyl-formamidine. | 132–133 |
| 7 | 5-amino-1,3-diphenylpyrazole | do | N'-[4-(hydroxymethyl)-1,3-diphenyl-5-pyrazolyl]-N,N-dimethylformamidine. | 149–151 |
| 8 | 5-amino-1,3-dimethylpyrazole | do | N'-[4-(hydroxymethyl)-1,3-dimethyl-5-pyrazolyl]-N,N-dimethylformamidine. | 93–98 |
| 9 | 5-amino-1-phenylpyrazole | do | N'-[4-(hydroxymethyl)-1-phenyl-5-pyrazolyl]-N,N-dimethylformamidine. | Oil |

[1] The compounds shown in this column represent the final products obtained after reduction of the intermediate formed by the reaction of the starting materials listed in Columns A and B.

EXAMPLE 10

N'-[4-(hydroxymethyl)-1,3-diphenyl-5-pyrazolyl]-N,N-dimethylacetamidine

Following the procedure of Example 1, 23.5 grams (0.1 mole) of 5-amino-1,3-diphenylpyrazole is reacted with 35 grams (0.4 mole) of N,N-dimethylacetamide and phosphorous oxychloride. Crystallization from ethanol yields 16.8 grams of N'-(1,3-diphenyl-5-pyrazolyl)-N,N-dimethylacetamidine. The compound is then reacted with dimethylformamide and phosphorous oxychloride, repeating the same reaction scheme yielding N'-(4-formyl- The compounds of this invention exhibit valuable pharmacological properties, especially as anti-inflammatory and anti-pyretic agents. In order to illustrate anti-pyretic properties, a group of rats are injected with Brewers yeast by intramuscular injection to produce a feverish condition. The group is split into a control group and a test group. When the fever has stabilized at 3 degrees F. or higher, the test compounds are administered to the test group and placebos to the control group. Administration may be oral or by injection. Rectal temperatures are taken at hourly intervals after administration. The 3 hour reading is used to calculate fever and percent reduction in fever between drug and placebo groups.

Table II below shows the results from a representative number of the compounds of the instant invention. In each case, administration is by the oral route. These doses indicated in the table are given in terms of milligrams per kilogram of body weight of the rat. The term $LD_{50}$ represents the dosage at which the test compound is toxic to 50 percent of the animals in the test group.

TABLE II

| | Compound | Dose, mg./kg. | Percent reduction | $LD_{50}$, mg./kg. |
|---|---|---|---|---|
| 1 | N'-[4-(hydroxymethyl)-1,3-diphenyl-5-pyrazolyl]-N,N-dimethylformamidine. | 10 | 30 | 6,750 |
| | | 20 | 45 | |
| | | 30 | 81 | |
| 2 | N'-[4-(hydroxymethyl)-1,3-dimethyl-5-pyrazolyl]-N,N-dimethylformamidine. | 100 | 28 | >1,000 |
| 3 | N'-[4-(hydroxymethyl)-1,3-diphenyl-5-pyrazolyl]-N,N-dimethylacetamidine. | 25 | 67 | >1,000 |
| | | 50 | 50 | |
| 4 | N'-[4-(hydroxymethyl)-3-methyl-1-phenyl-5-pyrazolyl]-N,N-dimethylformamidine. | 50 | 5 | 300 |
| | | 100 | 18 | |
| 5 | N,N-diethyl-N'-[4-(hydroxymethyl)-1,3-diphenyl_5-pyrazolyl]-formamidine. | 100 | 30 | >1,000 |
| 6 | 4-[N-[4-(hydroxymethyl)-1,3-diphenyl-5-pyrazolyl/formimidoyl]morpholine. | 50 | 4 | >1,000 |
| | | 200 | 38 | |

In order to demonstrate anti-inflammatory activity, a modification of the method described by C. A. Winter, et al., Proc. Soc. Exp. Med., 1962, 111:544 is utilized. Test compounds are administered to a group of test rats 30 minutes prior to an injection of carrageenan into the hind paw of the rats. Peak edema occurs 3 hours after the phlogistic injection, at which time the percent inhibition is calculated from the difference between the drug and placebo groups. The control group is administered water or silane as the placebo. Administration may be by the oral route or by injection.

Table III below shows the results for a representative number of the compounds of this invention when tested according to this procedure. In each case, the compounds are administered by the oral route. The dosages are given in terms of milligrams of compound per kilogram of animal body weight. Again, the $LD_{50}$ represents the dosage at which the test compound is toxic to 50 percent of the animals in the test group.

TABLE III

| | Compound | Dose, mg./kg. | Percent inhibition | $LD_{50}$, mg./kg. |
|---|---|---|---|---|
| 1 | N'-[4-(hydroxymethyl)-1,3-diphenyl-5-pyrazolyl]-N,N-dimethylformamidine. | 30 | 18 | 6,750 |
| | | 40 | 26 | |
| | | 60 | 28 | ---------- |
| 2 | N'-[4-(hydroxymethyl)-1,3-dimethyl-5-pyrazolyl]-N,N-dimethylformamidine. | 100 | 19 | >1,000 |
| 3 | N'-[4-(hydroxymethyl)-1,3-diphenyl-5-pyrazolyl]-N,N-dimethylacetamidine. | 25 | 12 | >1,000 |
| | | 50 | 18 | |
| | | 100 | 17 | |
| 4 | N,N-diethyl-N'-[4-(hydroxymethyl)-1,3-diphenyl-5-pyrazolyl]formamidine. | 50 | 14 | >1,000 |
| 5 | 4-[N-[4-(hydroxymethyl)-1,3-diphenyl-5-pyrazolyl]formimidoyl]morpholine. | 50 | 6 | >81,000 |

The compounds of this invention may be administered orally, or as injectable solutions. Oral administration includes tablet preparations as well as oral suspensions and emulsions. Administration by injection includes intramuscular, intraperitoneal as well as intravenous injections. Methods for formulating such preparations as tablets, emulsions, and injectable solutions are generally known in the art.

Others may practice this invention in any of the numerous ways which will be suggested to one skilled in the art upon reading this disclosure. All such practice of the invention is considered to be covered hereby provided it falls within the scope of the appended claim.

We claim:

1. A compound of the formula

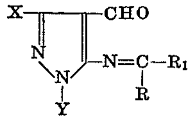

wherein R is hydrogen or loweralkyl; $R_1$ is diloweralkylamino, piperidino, 1-piperazinyl, 4-methyl-1-piperazinyl and morpholino; X is phenyl or loweralkyl; and Y is phenyl, loweralkyl or halophenyl.

References Cited

UNITED STATES PATENTS

| | | | |
|---|---|---|---|
| 3,073,851 | 1/1963 | Steiger | 260—306.8 R |
| 3,318,940 | 5/1967 | Schmidt | 260—268 H |
| 3,544,585 | 12/1970 | Swett et al. | 260—310 R |

JOHN D. RANDOLPH, Primary Examiner

U.S. Cl. X.R.

260—247.5 R, 268 K, 268 H, 293.7, 465 E; 424—248, 250, 267, 273